(12) United States Patent
Stein

(10) Patent No.: US 7,591,176 B2
(45) Date of Patent: Sep. 22, 2009

(54) WIND-POWERED WIRELESS (RF) ANEMOMETER

(76) Inventor: William Stein, 274 Sunderland Rd., Amherst, MA (US) 01002

( * ) Notice: Subject to any disclaimer, the term of this patent is extended or adjusted under 35 U.S.C. 154(b) by 0 days.

(21) Appl. No.: 12/267,656

(22) Filed: Nov. 10, 2008

(65) Prior Publication Data
US 2009/0100923 A1    Apr. 23, 2009

Related U.S. Application Data

(63) Continuation of application No. 11/422,908, filed on Jun. 8, 2006, now Pat. No. 7,454,968.

(60) Provisional application No. 60/688,502, filed on Jun. 8, 2005.

(51) Int. Cl.
*G01W 1/00* (2006.01)
(52) U.S. Cl. .................................................. 73/170.01
(58) Field of Classification Search .............. 73/170.01, 73/170.05, 170, 16; 340/601
See application file for complete search history.

(56) References Cited

U.S. PATENT DOCUMENTS

| | | | |
|---|---|---|---|
| 2,346,864 A * | 4/1944 | Packard | 73/861.85 |
| 2,438,674 A * | 3/1948 | Newell | 200/81.9 R |
| 5,263,380 A * | 11/1993 | Sultan et al. | 73/204.26 |
| 5,710,380 A * | 1/1998 | Talley et al. | 73/861.85 |
| 5,783,745 A * | 7/1998 | Bergman | 73/170.13 |
| 6,257,074 B1 * | 7/2001 | Kellerman | 73/861.94 |
| 6,761,064 B2 * | 7/2004 | Tsuji | 73/170.02 |
| 6,997,050 B2 * | 2/2006 | Fleming | 73/170.01 |

* cited by examiner

*Primary Examiner*—Andre J Allen
(74) *Attorney, Agent, or Firm*—Michael A. Blake

(57) ABSTRACT

A wireless wind-powered anemometer comprising: a wind reacting device; a rotatable shaft in communication with the wind reacting device; an ac generator in communication with the rotatable shaft, and where the ac generator is configured to produce an ac voltage that is generally directly proportional to wind speed detected by the wind reacting devices; a signal conditioning and transmitter circuit in communication with the ac generator; and where the signal conditioning and transmitter circuit is configurable to communicate with a wireless network, and where the signal conditioning and transmitter circuit is supplied with power from the ac generator. A wireless wind-powered anemometer comprising: a plurality of conic cups; a rotatable cap fixedly attached to the plurality of conic cups; a shaft fixedly attached to the rotatable cap; a shaft housing rotatably attached to the shaft, and configured such that the shaft rotates with respect to the shaft housing and the shaft housing remains stationary; a first bearing in communication with the shaft and the shaft housing; an electronic housing fixedly attached to the shaft housing; an armature located within the electronic housing and fixedly attached to the shaft; a stator/circuit board located within the electronic housing, fixedly attached to the electronic housing, rotatably attached to the shaft, and configured such that shaft rotates with respect to the stator and the stator remains stationary; a top side of the stator facing the armature; an under side of the stator facing away from the armature; a plurality of coils located on the armature; a plurality of magnets located on the top side of the stator; a second bearing in communication with the shaft and the stator/circuit board, and configured to allow the shaft to rotate with respect to the stator/circuit board; a transmitter located on the stator/circuit board; and an antenna in signal communication with the transmitter.

8 Claims, 8 Drawing Sheets

WIND-POWERED WIRELESS (RF) ANEMOMETER

CROSS-REFERENCES

This application is a continuation application of U.S. Ser. No. 11/422,908, filed Jun. 8, 2006 now U.S. Pat. No. 7,454,968, TO William M. Stein, entitled "Wind-Powered Wireless (RF) Anemometer", the contents of which are fully incorporated by reference herein. This patent application claims the benefit of provisional patent application Ser. No. 60/688,502 by William M. Stein, entitled "Wind-powered Wireless (RF) Anemometer", filed on Jun. 8, 2005, the entire contents of which are fully incorporated by reference herein.

TECHNICAL FIELD

This invention relates to anemometers, and more particularly to wind-powered wireless anemometers.

BACKGROUND

Many industries currently require accurate measurement of wind velocities. Measurements of wind velocity are currently performed by several different types of sensors or transducers. The most common type is the cup anemometer. Other types include propeller anemometers, sonic anemometers and most recently sodar and lidar anemometers, which are similar to radar in their principal of operation.

Anemometry is used for many purposes in addition to the obvious use as a weather instrument. Wind measurements are taken to determine sound and dispersion patterns. Measurements are taken to determine safety on highways and bridges. A major use of wind measurements is for the wind-power industry, for dispatch and control of wind farms.

All current in situ anemometers require a signal cable, and/or a power cable. Elimination of these cables would be useful for a variety of reasons. A powerful reason for eliminating the cables is because of the lightning hazard the cables present. A lightning strike can be conducted down the wire to ancillary data loggers or displays, which will cause damage to this equipment as well as the transducer. Cables and connectors can become corroded and require maintenance. And furthermore, cables are an additional expense, anywhere from $0.25 to over $1.00 per foot, additionally there is the labor and time involved in installing the cables.

Therefore, an anemometer that overcomes these and other disadvantages is desired.

SUMMARY

The disclosed invention relates to a wireless wind-powered anemometer comprising: a wind reacting device; a rotatable shaft in communication with the wind reacting device; an ac generator in communication with the rotatable shaft, and where the ac generator is configured to produce an ac voltage that is generally directly proportional to wind speed detected by the wind reacting devices; a signal conditioning and transmitter circuit in communication with the ac generator; and where the signal conditioning and transmitter circuit is configurable to communicate with a wireless network, and where the signal conditioning and transmitter circuit is supplied with power from the ac generator.

The disclosed invention also relates to a wireless wind-powered anemometer comprising: a plurality of conic cups; a rotatable cap fixedly attached to the plurality of conic cups; a shaft fixedly attached to the rotatable cap; a shaft housing rotatably attached to the shaft, and configured such that the shaft rotates with respect to the shaft housing and the shaft housing remains stationary; a first bearing in communication with the shaft and the shaft housing; an electronic housing fixedly attached to the shaft housing; an armature located within the electronic housing and fixedly attached to the shaft; a stator/circuit board located within the electronic housing, fixedly attached to the electronic housing, rotatably attached to the shaft, and configured such that shaft rotates with respect to the stator and the stator remains stationary; a top side of the stator facing the armature; an under side of the stator facing away from the armature; a plurality of coils located on the armature; a plurality of magnets located on the top side of the stator; a second bearing in communication with the shaft and the stator/circuit board, and configured to allow the shaft to rotate with respect to the stator/circuit board; a transmitter located on the stator/circuit board; and an antenna in signal communication with the transmitter.

The invention also relates to a wireless wind-powered anemometer system comprising: a wind reacting device; a rotatable shaft in communication with the wind reacting device; an ac generator in communication with the rotatable shaft, and where the ac generator is configured to produce an ac voltage that is generally directly proportional to wind speed measured by the wind reacting device; a signal conditioning and transmitter circuit in communication with the ac generator; and a wireless network configured to in communication with the signal conditioning and transmitter circuit.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

State-of-the-art microelectronics has made possible small, low power, low data rate radio communication. A number of new radio frequency ("RF") technologies have been recently introduced. There is significant activity in the research community to develop means to scavenge power from the environment to power tiny sensor "motes" which can form ad-hoc wireless networks, transmitting data about the environment to a central location.

This invention is the realization that a conventional mechanical transducer anemometer is not only a transducer for determining wind velocity, but also a tiny wind turbine power plant, capable of powering signal conditioning circuitry, a microcontroller and a low power transmitter for transmission of its data to a central receiver.

In its simplest form, the disclosed wind-powered wireless anemometer can be used as a wireless replacement for conventional mechanical anemometers. The wind-powered wireless anemometer can be located exactly where the wired unit was installed. A receiver-decoder may be placed approximately at the former wire terminus. The disclosed wind-powered wireless anemometer may be targeted for the replacement market. Any anemometer systems needing replacement due to normal wear and tear could be simply upgraded to the newly disclosed wind-powered wireless anemometer and eliminate the wire connection.

Figure 1:
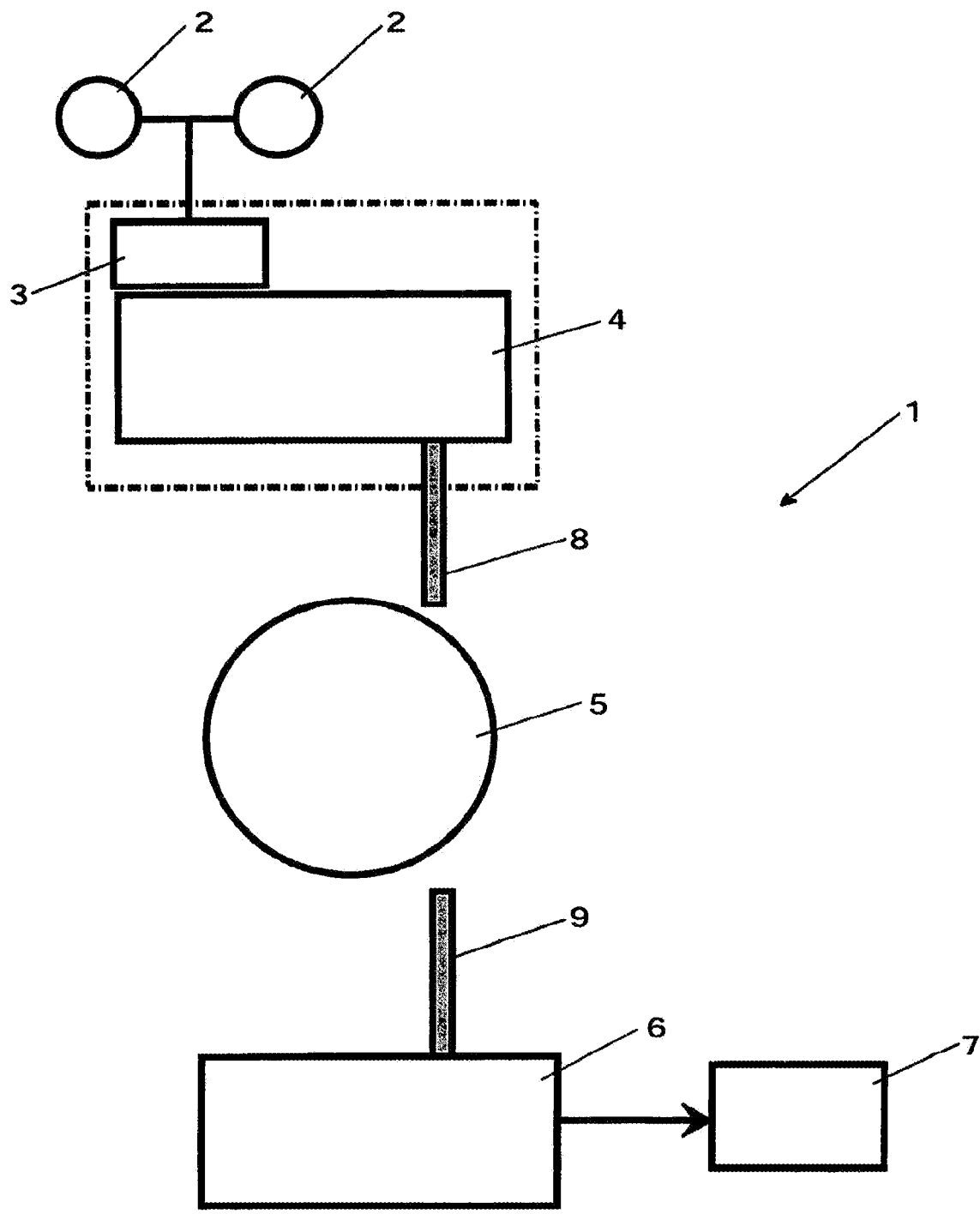
FIG. 1 is a schematic diagram of the disclosed anemometer system.

FIG. 1 shows one embodiment of the disclosed wind-powered wireless anemometer system 1. Rotatable cups 2 are shown in communication with a wind-speed sensor/AC generator 3. The wind-speed sensor/AC generator 3 is in communication with a microcontroller and an RF transmitter 4. The RF transmitter 4 is in communication, via an antenna 8, with a wireless network 5. The wireless network 5 may be in communication with a receiver and/or microcontroller 6 via another antenna 9. The receiver and/or microcontroller may be in communication with a data logger 7.

In a more complicated system, where multiple measurements are required, a plurality of wind-powered wireless anemometer may enter and join a network of wind-powered wireless anemometer using the network topology most suitable. One promising standard for low data rate, low power transmissions is "Zigbee".

Theoretical Power in a Cross Section of Wind

To show the general magnitude of energy in the wind available from a small cross section, a table of energy associated with wind speed for a small area is shown below. In this example a cross-sectional area based upon a 6 inch diameter is used.

| Pwr(mW) | radius(ft) | wind speed(mph) |
|---|---|---|
| 1.040125 | 0.25 | 1 |
| 8.321 | 0.25 | 2 |
| 66.568 | 0.25 | 4 |
| 532.544 | 0.25 | 8 |
| 4260.352 | 0.25 | 16 |
| 34082.816 | 0.25 | 32 |

Note that this is the energy available in the wind. Any practical device will deliver less. A typical modern wind turbine might capture as much as 35 to 40% of the energy content in the wind. The disclosed wind-powered wireless anemometer may be expected to deliver about 10% to about 20% of the energy in the wind. Using a conservative 10% power coefficient, the power available at 8 mph, would be approximately 50 mW.

Measured Power from a Typical Anemometer

Figure 2:
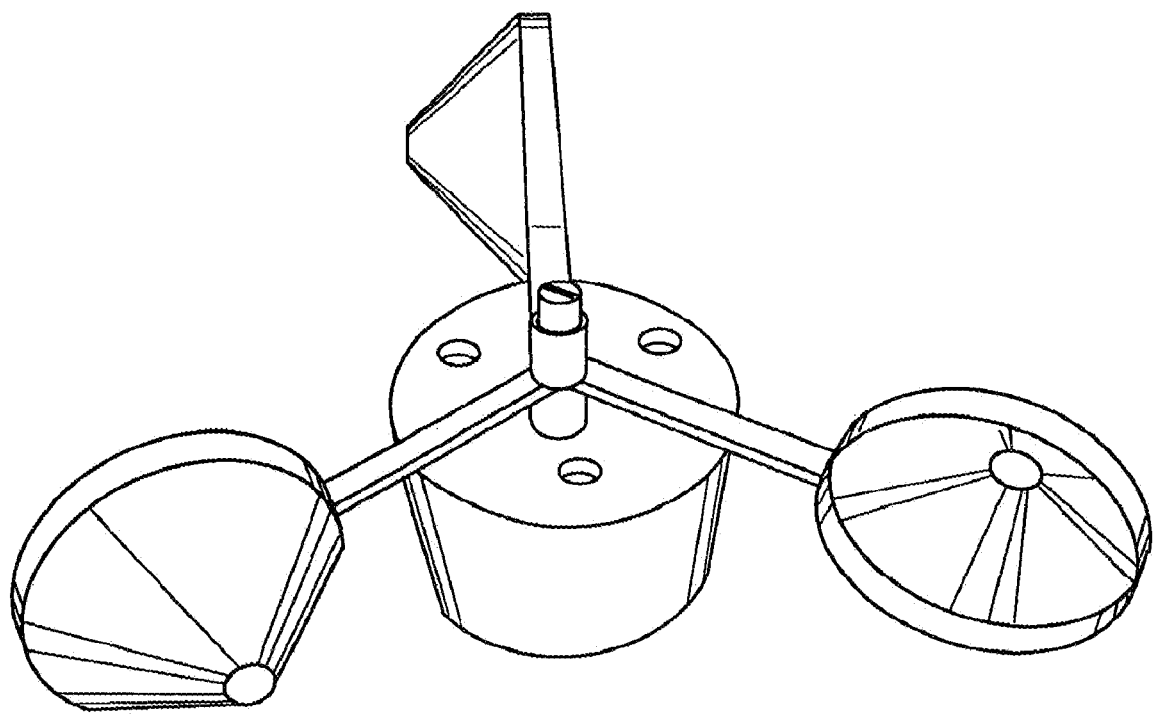
FIG. 2 is a perspective view of an anemometer.

One of the workhorses of the wind-power industry is the Maximum #40 anemometer. It is shown in FIG. 2. The Maximum #40 anemometer is a typical drag cup type anemometer. The transfer function for this anemometer is represented by the following equation:

mph=(Hz×1.711)+0.78

Note that the Maximum #40 anemometer has three rotating cups. The cups rotate on an axle, and attached to the axle inside the body of the anemometer is a small round magnet, approximately 1 inch in diameter, by ½ inch thick. Located near the magnet, in a position to intercept magnetic flux changes as the magnet rotates is a single coil of many turns. This coil and magnet is the basis for an AC generator suitable for providing a sinusoidal AC signal suitable for input to data loggers and readouts when connected by a pair of conducting wires. This signal is far too small to provide useful power.

Figure 3:
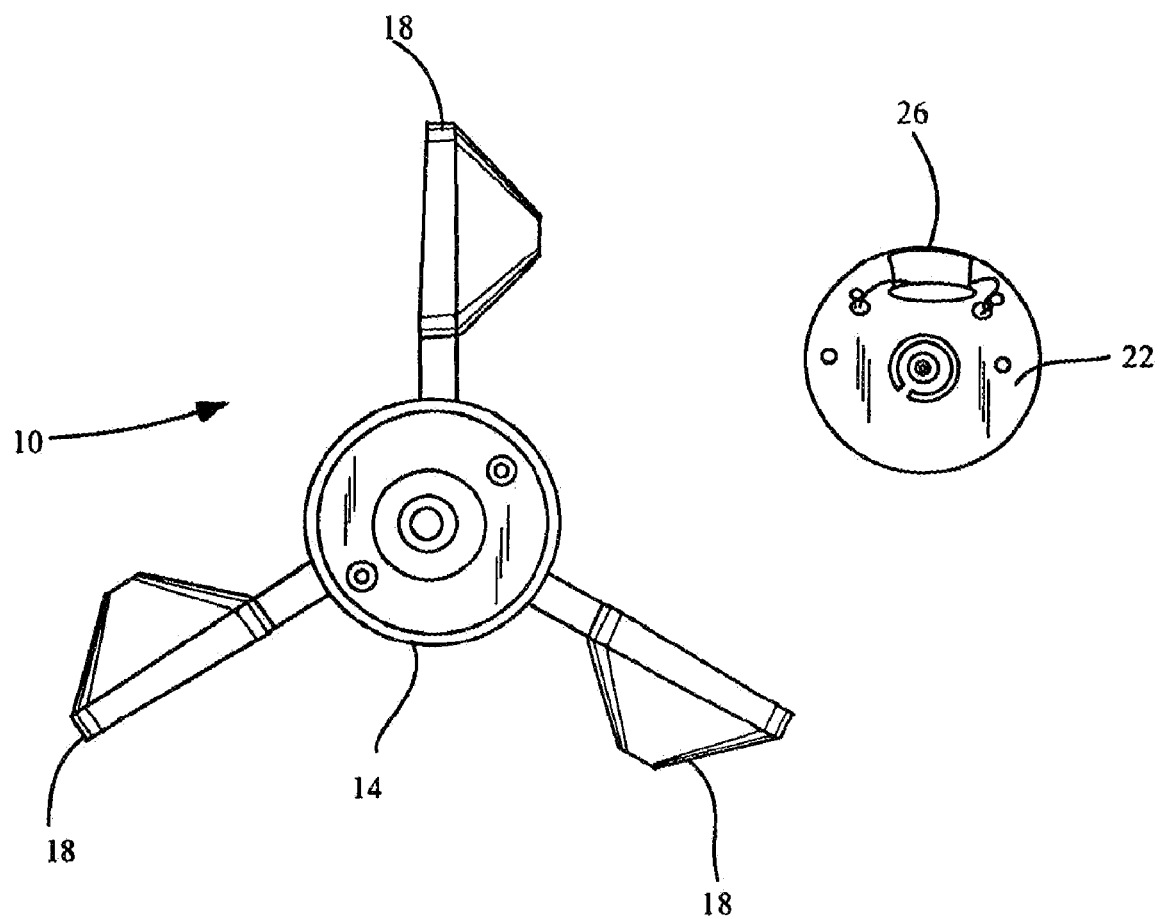
FIG. 3 is the anemometer of FIG. 2, with the base removed.

The internal construction of the Maximum #40 anemometer is shown in FIG. 3. A drag cup assembly 10 is shown. At its center is a circular magnet 14. The circular magnet 14 spins with the cups 18. To the right of the drag cup assembly 10 is a base 22 which may hold a single coil 26.

The output of the Maximum #40 was measured with a digital storage oscilloscope (DSO), at 3 wind speeds and the data indicates that the voltage is approximately linear with frequency. Below is a table that summarizes the data from the oscilloscope capture.

| Hz | wind speed | millivolts (p-p) |
|---|---|---|
| 6.0 | 11.0 | 90.00 |
| 12.9 | 22.9 | 200.00 |
| 18.9 | 33.1 | 280.00 |

The anemometer as a generator can be modeled as a voltage source with a series impedance. The resistive component may be about 650 ohms at RT, indicative of the length of the coil of wire used to make the AC generator. Optimal power transfer will occur with a load resistance of about 650 ohms. With this load it is expected that half the source voltage to be delivered to the load.

The power available would be $P=V^2/R$. At the 3 measured wind speeds the power available is shown in the table below:

| mVrms | resistance | Pwr(mW) |
|---|---|---|
| 63.63 | 650 | $6e^{-6}$ |
| 141.4 | 650 | $3.1e^{-5}$ |
| 197.96 | 650 | $5.97e^{-5}$ |

The unmodified anemometer provides very little power. Too little even with very low power design electronics. Therefore, in one embodiment of the disclosed wind-powered wireless anemometer, there was added a second coil and added iron to the magnetic circuit. By doing this an increase in the power available was obtained. The power increase was about 1 mw at 20 mph.

Figure 4:
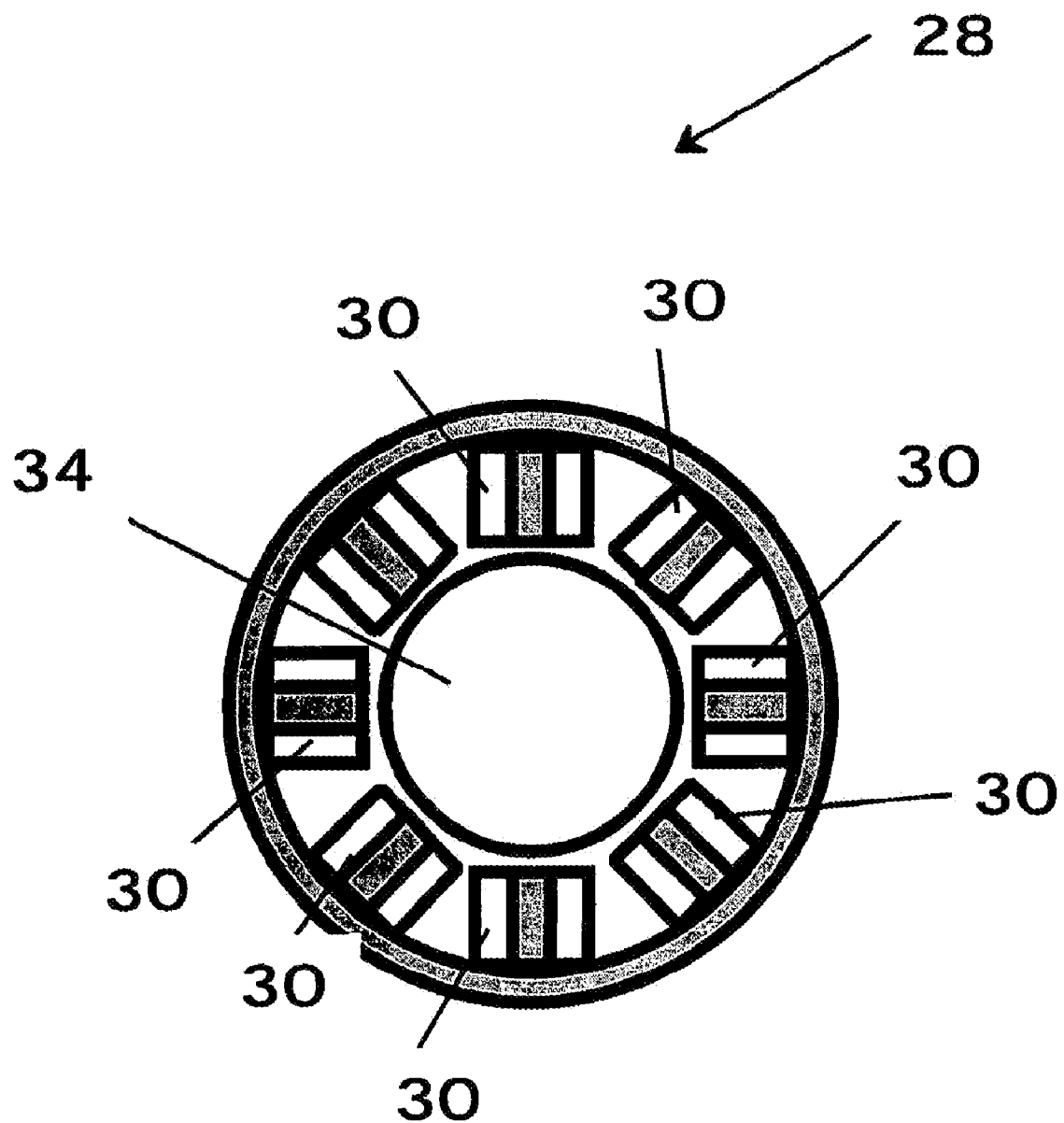
FIG. 4 is a cross-sectional view of a disclosed AC generator.

By altering the magnetic circuit and windings a suitable generator can be created, in the same mechanical envelope of the base, which will deliver enough power to the signal conditioning and transmitter. One embodiment of an AC generator 28 for use in the disclosed wind-powered wireless anemometer is pictured in FIG. 4. The AC generator may have eight coils 30 evenly spaced around a circular four pole magnet 34. The coils may be wound on plastic bobbins. The magnet may comprise a stack of silicon steel laminations, each lamination approximately circular, with about 8 teeth, each bobbin placed on a tooth. The air gap is intentionally large to minimize cogging, so that the anemometer may respond to low wind velocities.

Power Consumption from Proposed Circuitry

The circuitry used in the disclosed wind-powered wireless anemometer may consist of a microcontroller, a transmitter, a signal conditioner, a timer internal to the microcontroller to trigger execution on a periodic basis, between which times the electronics may "sleep." With a duty cycle of on for about ½ second to off for about 20 seconds the average power consumption will be about 1/40th of the amount consumed if on all the time. This would allow about nearly 80 mW consumption, assuming an average power available from the anemometer/generator of about 2 mW.

Data Encoding and Transmission

A very small data packet consisting of the wind speed, wind direction (optional) and a checksum are all that is needed to be transferred by the RF transmitter shown in FIG. 1. The data may be Manchester encoded and modulation of the carrier may be on/off keying (OOK), a type of AM. In OOK, the carrier is turned on and off, representing the zeroes and ones in the data stream. This has the additional advantage in saving power by virtue of the fact that on average the data will be 50% zeroes and 50% ones, meaning that the transmitter will be consuming power only half the time during transmission.

Data Decoding and Emulation

The decoding may use either time slice or a PLL to decode the Manchester OOK. The microcontroller may then synthesize a sinusoidal output at the correct voltage and frequency to emulate the original sensor.

Detailed Schematic and Description of the Electronics

Figure 5:
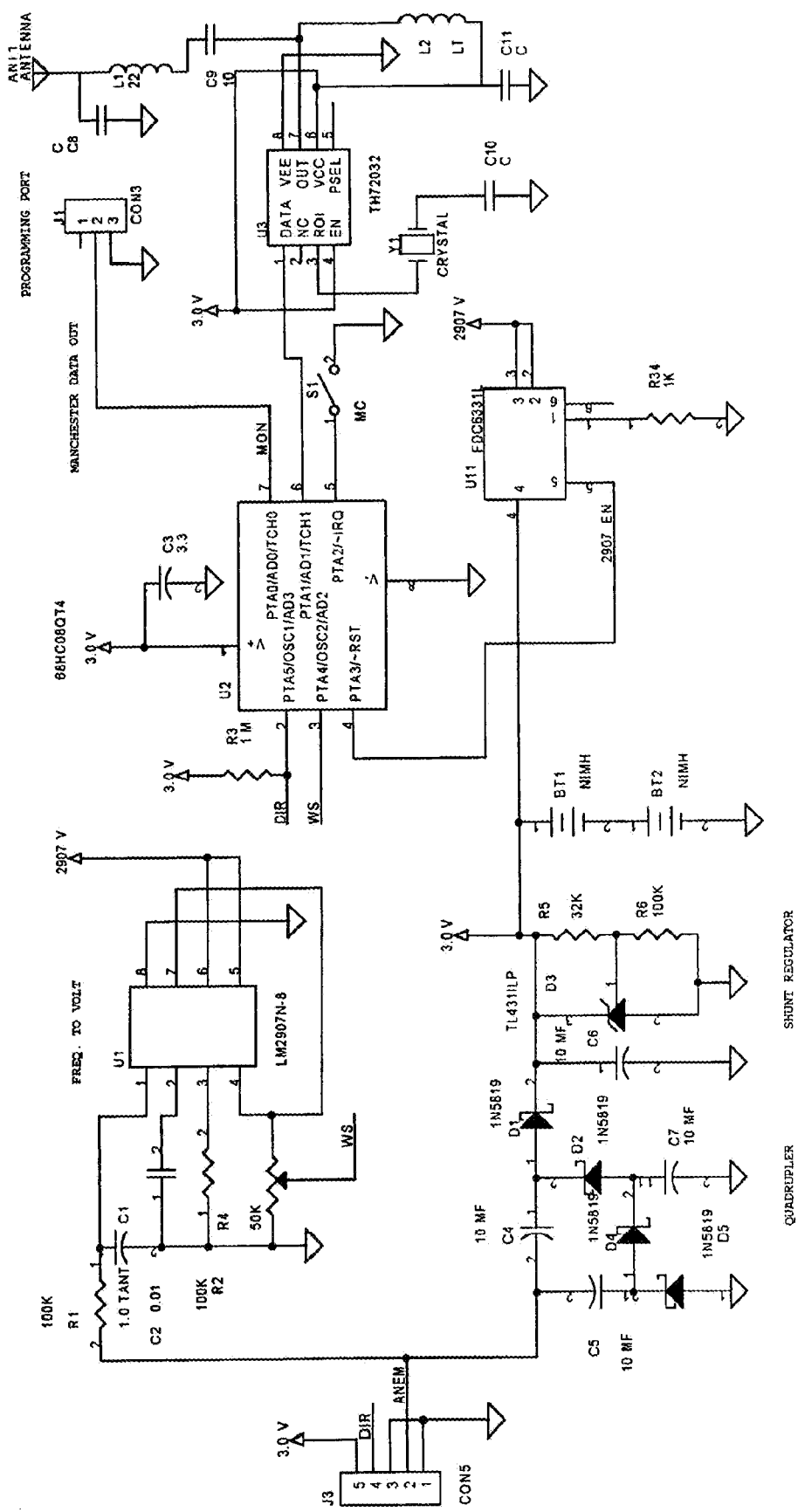
FIG. 5 is a schematic diagram of one embodiment of the disclosed electronics for the anemometer.

FIG. 5 is a schematic of one embodiment of the electronics required to transmit the data from the sensor to the ground based receiving station. The electronics are small, and will be housed in the anemometer body. The only protrusion will be a small antenna for transmission of the data with a carrier of 916 mHz.

Referring to FIG. 5, the anemometer generator is connected to the circuitry at J3. This is both the power and signal line from the AC generator. Additionally at this connector is a provision to connect a conventional potentiometer based wind direction sensor. The generator output is then connected to a voltage quadrupler, consisting of diodes D1, D2, D4, D5. This quadruples the incoming voltage so that even at very low wind speeds, and subsequently low voltage the generator output will be large enough to provide charging to the rechargeable batteries, labeled BT1 and BT2. It may be desirable to have two individual quadruplers depending upon the exact wiring of the coils from the generator. As indicated with respect to the discussion of FIG. 3, there may be two sets of windings, with every other coil connected together to create phase windings. Each phase winding would then feed a separate quadrupler.

A shunt regulator, D3, prevents overcharging by limiting the voltage to about 3.5 volts, under any condition of generator output.

The generator output is also connected to an integrated circuit, a frequency to voltage converter, (V/F) labeled U1. This IC converts frequency to voltage such that the microcontroller, U2 will be able to quickly sample a voltage, which is a function of the wind speed by virtue of the fact that the generator AC output has a frequency dependent upon the wind speed.

U2 is a low power 8 bit microcontroller, which includes timers, counter, and analog to digital converters (A/D). The firmware which executes will be described shortly. A last note. U11 is a solid state switch which allows the microcontroller to turn off the F/V converter and the RF transmitter (U3) to save power during the power down between samples and updating.

Figure 6:
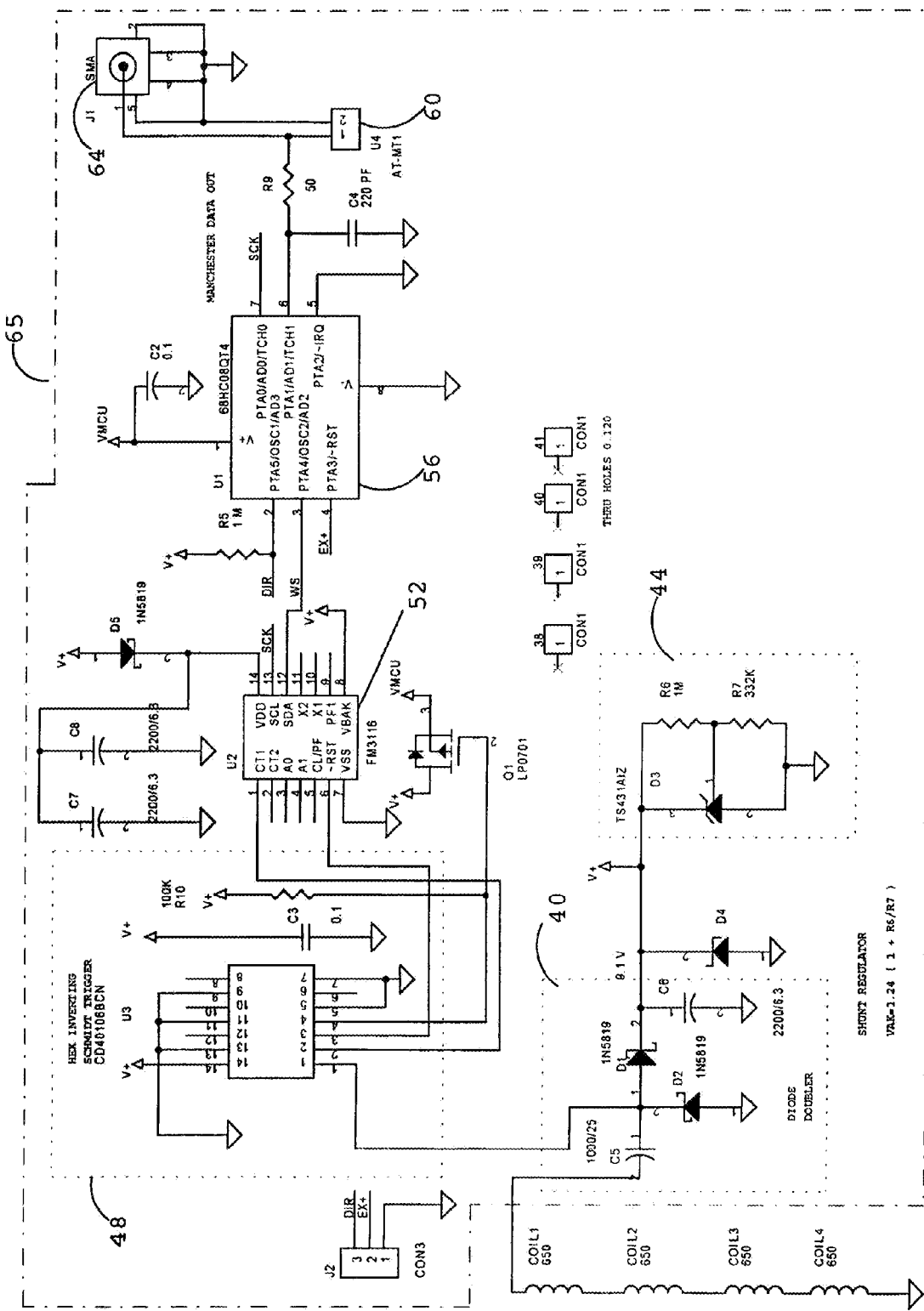
FIG. 6 is a schematic diagram of another embodiment of the disclosed electronics for the anemometer.

FIG. 6 is a schematic diagram of another embodiment of the coils and electronics required to transmit the data from the sensor to the ground based receiving station. A plurality of coils are shown labeled as COIL1, COIL2, COIL3, and COIL4. These plurality of coils comprise the stator windings of the AC generator located in the disclosed wind-powered wireless anemometer. The AC generator provides the power to the electronics in the disclosed anemometer. A benefit of using an AC generator is that the frequency of the sinusoidal voltage developed by the AC generator is generally directly proportional to the wind speed measured by the anemometer. The coils COIL1, COIL2, COIL3, and COIL4 are in signal communication with the diodes D1 and D2. Diodes D1 and D2 comprise a full wave rectifier 40 that performs a voltage doubling. The full wave rectifier 40 is in signal communication with diode D4. Diode D4 is a zener diode that is configured to limit the voltage from going above a predefined value. In one embodiment the predefined value may be about 9.1 volts. In signal communication with diode D4 is a shunt voltage regulator 44. Integrated circuit D3, and resistors R6 and R7 comprise the shunt voltage regulator 44. The shunt voltage regulator 44 limits the voltage in the circuit to no more than a certain predefined value. In one embodiment, that value may be about 5 volts. In signal communication with shunt voltage regulator 44 are capacitors C6 and C7. Capacitors C6 and C7 are configured to act as energy storage capacitors. The coils COIL1, COIL2, COIL3, and COIL4 are in signal communication with a Schmidt trigger 48. The Schmidt trigger is comprised by a hex inverting buffer. The Schmidt trigger converts the sinusoidal wave from the sinusoidal voltage, into a square wave of the same frequency. The Schmidt Trigger 48 is signal communication with an integrated circuit U2 which is an event counter 52. The event counter 52 counts the rising edges of the square wave, and stores the information. The event counter 52 is in signal communication with U1 which is a microcontroller 56. The microcontroller 56 is configured to query the event counter 52 at certain timed intervals. The microcontroller 56 is in signal communication with a signal transmitter 60. The transmitter 60 in this embodiment is an AM transmitter using on/off keying. The signal transmitter 60 transmits information received by the microcontroller 56 after it (the microcontroller 56) has queried the event counter 52. A receiver, not shown in this figure, measures the time since the last transmission, and calculates the wind speed measured by the disclosed anemometer. The wind-powered wireless anemometer may be calibrated to about 1 mile per hour per hertz. A connector 64 may be configured to allow the connection of an antenna. Connector 66 may be configured to allow the connection of a wind direction section sensor to the electronics. The voltage output from the wind direction sensor may be communicated to the microcontroller 56 at pin 2 labeled DIR. The circuitry and components located within the boundaries of the box 65 may be located on a circuit board known as a signal conditioning and transmitter circuit board 65.

Firmware

One method of operation for disclosed wind-powered wireless anemometer follows, however it should be recognized that various methods of operation may be implemented for the disclosed wind-powered wireless anemometer. The microcontroller will be in low power mode. Its internal timer will operate in low power mode. After about 20 seconds, as determined by its internal timer, the microcontroller will resume normal operation, i.e. returns from low power mode. At this time the microcontroller's A/D converter will sample U1, the F/V converter, to determine the current wind speed. It additionally will sample the potentiometer voltage to determine the wind direction. The microcontroller will take these values and append an identification tag to these values for transmission. The microcontroller will calculate a cyclic redundancy check to be included in the transmission. At this time, the microcontroller converts the above mentioned bytes to a serial bit stream, which is Manchester encoded. This is also referred to as split phase or biphase encoding.

In general, when transmitting serial data to a radio receiver, a DC component of zero must be maintained (over a finite time). This is so the demodulator in the receiver can properly interpret the received data as 1's and 0's. Manchester encoding allows us to do this.

Manchester encoding follows these rules:
1. If the original data is a Logic 0, the Manchester code is: 0 to 1 (upward transition at bit center)
2. If the original data is a Logic 1, the Manchester code is: 1 to 0 (downward transition at bit center)

There are two bits of Manchester encoded data for each bit of original data. The penalty for doing this is Manchester encoded data consumes more bandwidth than non-return to zero (NRZ) encoding.

The data, now Manchester encoded, is sent to the RF transmitter. Either frequency shift keying (FSK), a form of FM, or On/Off keying (OOK), a form of AM will be utilized. Each has its own merits and drawbacks, but both will work. Consider OOK first. OOK is the simple process of turning the carrier on to represent a 1, and turn the carrier off to represent the zeroes in the bit stream. This type of transmission has an average duty of 50%, which cuts the power devoted to RF transmission in half. It is less resistant to being corrupted by radiated electrical noise than FSK.

FSK, on the other hand modulates the carrier by shifting the carrier away from its center frequency, positive for ones and negative for zeroes. For low bandwidth data rates a frequency deviation of +−30 kHz is typical. In either case a few milliwatts of transmitted RF will be sufficient to transmit over about 500 ft. on a clear outdoor path, typical of the environment of an anemometer mounted on a tall mast. There are numerous transmitter modules or integrated circuits commercially available for transmission in the FCC approved "unlicensed" industrial, scientific, medical (ISM) band which is at approximately 900 mHz. In one embodiment, U3 (shown in FIG. 5) is a single chip phase locked loop based transmitter for 915 mHz Receiving Base Station A radio receiver may be stationed at a distance from the transmitter. It is expected this distance can be from a few feet, to a few hundred feet, and perhaps even to several miles depending upon the power of the transmission, the gain of the antenna, and the sensitivity of the receiver.

The receiver tunes to the relevant frequency and demodulates the AM (OOK) or FM (FSK) depending upon the exact implementation. In some cases the integrated circuit receiver will contain all necessary decoding circuitry. See for example the Freescale (formerly Motorola) part MC33594. This receiver/decoder then presents the received data to a microcontroller for interpretation, display, and data logging.

Another Embodiment of the Disclosed Wind-Power Wireless Anenmometer

Figure 7:
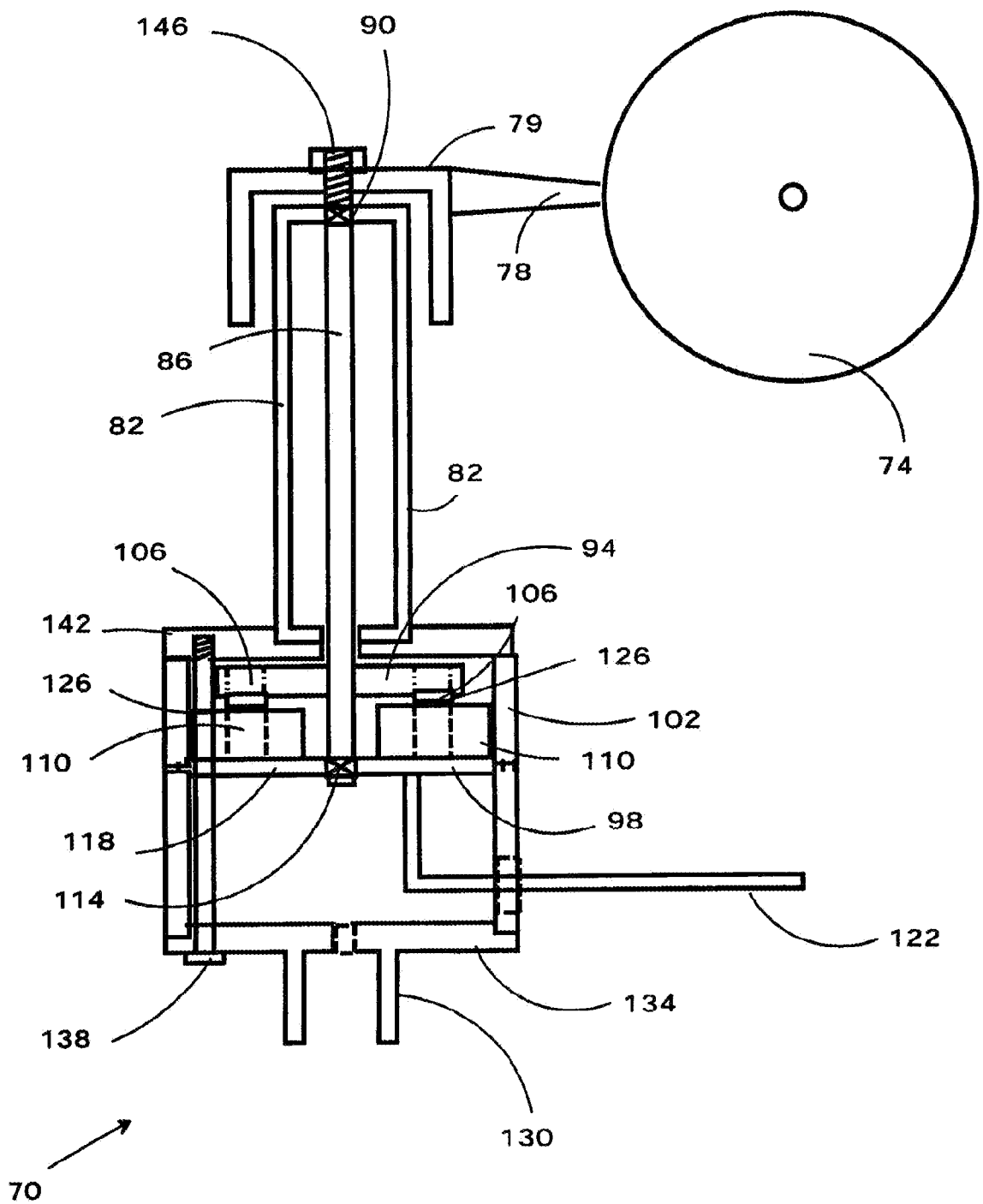
FIG. 7 is a cross-sectional view of another embodiment of the disclosed anemometer.

FIG. 7 is a cross-sectional view of another embodiment 70 of the disclosed wind-powered wireless anemometer. A conic cup 74 is shown attached to a rotatable cap 78. Although only one conic cup 74 is shown, there may be, 3, 4 or more conic cups attached to the rotatable cylindrical cap via a cup arm 79. The conic cup 74 may have an outer diameter of about 2.5 inches and be about 1 inch deep. Of course, the conic cup 74 may be sized differently based on differing conditions, locations, etc. Such differently sized cups 74, are still be within the scope of this disclosure. The conic cups 74 are the wind reacting device of the anemometer. The cap 78 is rotatably attached to a shaft housing 82. The cap 79 is fixedly attached to a shaft 86. A first bearing 90 is in communication with the shaft 86 and the shaft housing 82, and allows the shaft 86 to rotate with respect to the housing 82. The shaft is fixedly attached to an armature 94. A stator 98 is located adjacent to the armature 94. On the under side 118 of the stator 98 is located the signal conditioning and transmitter circuits described with respect to the circuit board 65 in FIG. 6. The stator 98 may be made out of circuit board material. Thus the stator 98 is actually the circuit board 65. The coils 110 may be affixed to the top of the circuit board, with the other electronic components affixed to the bottom of the circuit board 65. This stator/circuit board configuration may be referred to as a "stator/circuit board 98". The stator/circuit board 98 is fixedly attached to an electronics housing 102. The armature has a plurality of magnets 106 distributed about the center of the armature 94. The armature 94 is configured to rotate with the shaft 86. The magnets 106 are located very close to the coils 110 and are configured to rotate with the armature 106 such that a rotating magnets 106 and stationary coils 110 work together as an AC generator. In one embodiment, there is an air gap 126 between the coils 110 and the magnets 106 of about 0.025 inches. The shaft 86 is in communication with a second bearing 114. The second bearing is attached to the stator/circuit board 98. The shaft is able to rotate in the first and second bearings 90, 114. In one embodiment the shaft 86 is about 4 inches long.

In signal communication with the circuit board, located under the stator/circuit board 98, is an antenna 122. The bottom of the electronics housing 102 may have a removable bottom 134. The electronics housing 102 may be a weatherproof housing to protect the electronics and other components within the housing. The antenna may be about 3.1 inches in length. The electronics housing 102 may have a mounting fixture 130. The removable bottom 134 may be held in place by an attaching means such as one or more screws 138. Only one of four screws is shown in FIG. 7. The screw(s) 138 may be threaded into the top 142 of the electronics housing 102. The shaft 86 may be threaded on its upper end 146. A nut 150 may be used to attach the shaft 86 to the rotatable cap 78. The cap 78 may also be threaded for attachment to the shaft 86.

The stator/circuit board 98 and the coils 110 may be manufactured such they have generally very little magnetic material, such as but not limited to: iron, or no magnetic material whatsoever. This lack of iron prevents the magnets 106 from being magnetically attracted to the coils 110 or stator/circuit board 98, thus allowing for a greater rotational freedom of the armature 94 with respect to the stator/circuit board 98. The freedom of rotation allows for the disclosed anemometer to measure wind speeds of very low magnitude.

Figure 8:
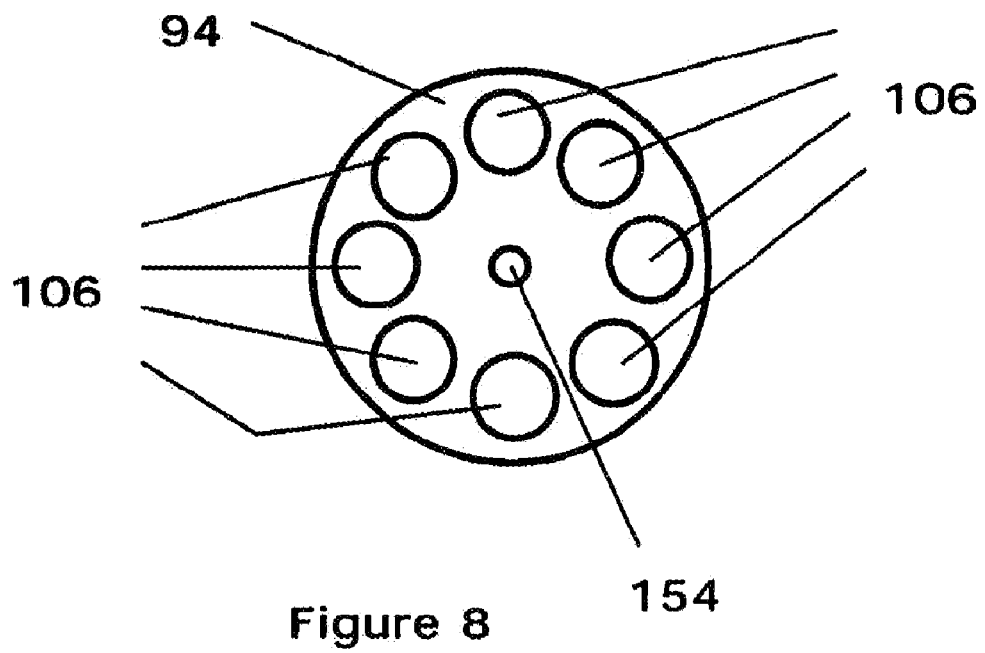
FIG. 8 is a top view of an armature.

FIG. 8 is a top view of the armature 94. The armature 94 has a generally circular shape. The armature 94 has a plurality of magnets 106 attached to it. These magnets 106 may also have a circular shape, but it certainly is not limited to magnets of a circular shape. The armature 94 has an opening 154 where the shaft 86 attaches to the armature 94. The shaft 86 may be glued, welded, or otherwise attached to the armature 94. The armature may have an outer diameter of about 1 and ¾ inches. The magnets may be about ⅜ inch long, and about ⅜ inch in diameter.

Figure 9:
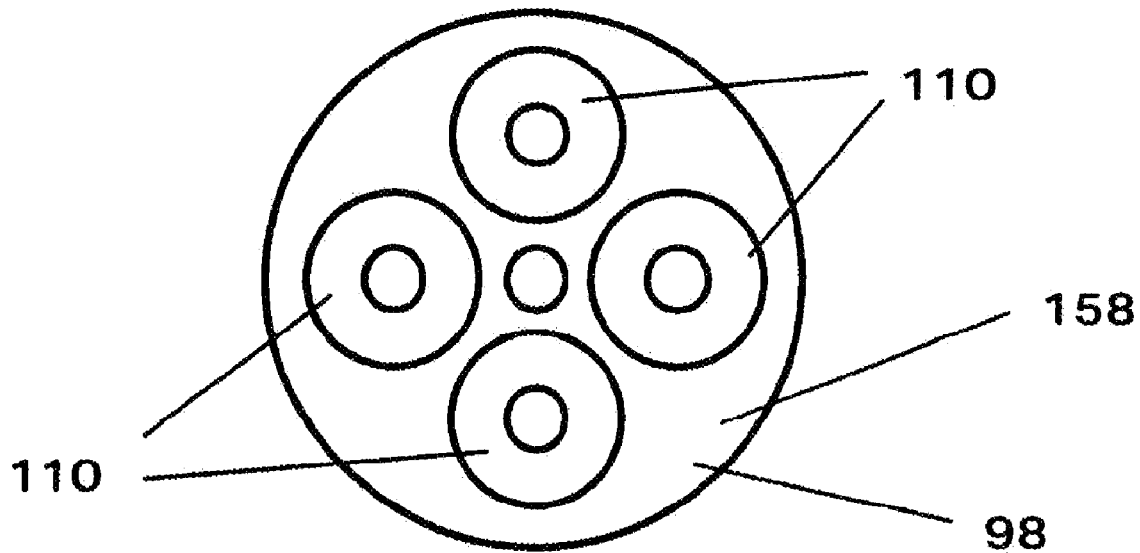
FIG. 9 is a top view of a stator/circuit board.

FIG. 9 is a top view of the stator/circuit board 98. The stator/circuit board 98, which may be made out of circuit board material, has a plurality of coils 110 on its top side 158. Not visible in this view, is the underside 118 of the stator/circuit board and the electronic components, which comprise the circuit board 65 discussed with respect to FIG. 6, may be attached to the underside 118. In other embodiments, a circuit board 65 with the electronic components may be attached to the underside 118 of a separate stator 98, and the coils 110 attached to the top side 158 of the separate stator 98. An opening 162 is located in the center of the stator/circuit board 98. The opening 162 is configured to hold a bearing 114. The bearing 114 allows the shaft 86 to rotate while the stator/circuit board remains stationary. The stator/circuit board 98 has a generally circular shape. The coils 110 also have a generally circular shape. The stator/circuit board may have an outer diameter of about 2 and 3/16 inches. The coils may have about a 3/4 inch outer diameter, and about a 1/4 inch inner diameter.

It will be obvious to one of ordinary skill in the art that any mechanical anemometer configuration suitable for driving a small generator is encompassed by this patent application. The disclosed invention may be easily modified to be usable with many types of anemometer, including, but not limited to a rotatable cup anemometer, a propeller anemometer, an impeller anemometer, and a savonious rotor anemometer. In other words any anemometer that rotates would be suitable for inclusion of a generator and ultra low power electronics for wireless transmission. Additionally, a DC generator may be used instead of an AC generator.

Any dimensions used in this paper are for illustrative purposes, other values for the give dimensions may be used and still be within the scope of the disclosed invention.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims

What is claimed is:

1. A wireless wind-powered anemometer comprising:
    a wind reacting device;
    a rotatable shaft in communication with the wind reacting device;
    an ac generator in communication with the rotatable shaft, and wherein the ac generator is configured to produce a generally sinusoidal ac voltage that is generally directly proportional to wind speed detected by the wind reacting devices;
    a signal conditioning and transmitter circuit in communication with the ac generator; and
    wherein the signal conditioning and transmitter circuit is configured to convert the generally sinusoidal ac voltage into a square wave, and to count each rising edge of the square wave and store the count, and is further configured to communicate with a wireless network, and wherein the signal conditioning and transmitter circuit is supplied with power from the ac generator.

2. The wireless wind-powered anemometer of claim 1, wherein the wind reacting device is selected from the group consisting of: rotatable cups, propeller, impellers, and savonious rotor.

3. A wireless wind-powered anemometer comprising:
    a wind reacting device;
    a rotatable shaft in communication with the wind reacting device;
    an ac generator in communication with the rotatable shaft, and wherein the ac generator is configured to produce an ac voltage that is generally directly proportional to wind speed detected by the wind reacting devices, the ac generator comprising:
        an armature fixedly attached to the shaft, such that the armature is configured to rotate with the shaft;
        a plurality of magnets attached to the armature;
        a stator/circuit board fixedly located adjacent to the armature; and
        a plurality of coils located on the stator/circuit board;
    a signal conditioning and transmitter circuit in communication with the ac generator; and
    wherein the signal conditioning and transmitter circuit is configurable to communicate with a wireless network; wherein the signal conditioning and transmitter circuit is supplied with power from the ac generator; and wherein the stator/circuit board and the plurality of coils have generally no magnetic material.

4. A wireless wind-powered anemometer comprising:
    a plurality of conic cups;
    a rotatable cap fixedly attached to the plurality of conic cups;
    a shaft fixedly attached to the rotatable cap;
    a shaft housing rotatably attached to the shaft, and configured such that the shaft rotates with respect to the shaft housing and the shaft housing remains stationary;
    a first bearing in communication with the shaft and the shaft housing;
    an electronic housing fixedly attached to the shaft housing;
    an armature located within the electronic housing and fixedly attached to the shaft;
    a stator/circuit board located within the electronic housing, fixedly attached to the electronic housing, rotatably attached to the shaft, and configured such that shaft rotates with respect to the stator and the stator remains stationary;
    a top side of the stator facing the armature;
    an under side of the stator facing away from the armature;
    a plurality of coils located on the armature;
    a plurality of magnets located on the top side of the stator;
    a second bearing in communication with the shaft and the stator/circuit board, and configured to allow the shaft to rotate with respect to the stator/circuit board;
    a transmitter located on the stator/circuit board; and
    an antenna in signal communication with the transmitter.

5. The wireless wind-powered anemometer of claim 4, wherein the electronics housing is weatherproof.

6. The wireless wind-powered anemometer of claim 4, further comprising:
    a removable bottom removeably attached to the wireless housing;
    a mounting fixture located on the removable bottom, and configured to be attachable to an object and thereby allow for the mounting of the wireless wind-powered anemometer.

7. A wireless wind-powered anemometer system comprising:
    a wind reacting device;
    a rotatable shaft in communication with the wind reacting device;
    an ac generator in communication with the rotatable shaft, and wherein the ac generator is configured to produce a generally sinusoidal ac voltage that is generally directly proportional to wind speed measured by the wind reacting device;

a signal conditioning and transmitter circuit in communication with the ac generator, the signal conditioning and transmitter circuit configured to convert the generally sinusoidal ac voltage into a square wave, and to count each rising edge of the square wave and store the count; and a wireless network configured to in communication with the signal conditioning and transmitter circuit.

8. The wireless wind-powered anemometer system of claim 7, wherein the wireless network communication with the signal conditioning and transmitter circuit is configured to be intermittent.

* * * * *